Figure 1:
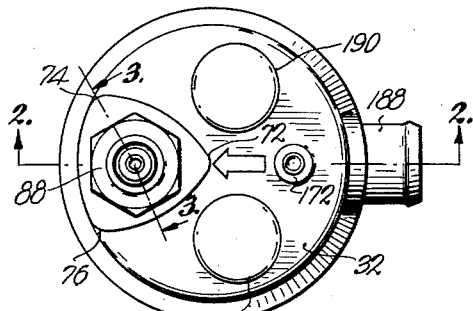

Sept. 14, 1965 W. C. BOTELER 3,206,175
HUMIDIFIER
Filed April 18, 1960 2 Sheets-Sheet 1

INVENTOR.
William C. Boteler
BY
Hovey, Schmidt, Johnson & Hovey
ATTORNEYS.

Sept. 14, 1965     W. C. BOTELER     3,206,175
HUMIDIFIER

Filed April 18, 1960     2 Sheets-Sheet 2

INVENTOR.
William C. Boteler
BY
Hovey, Schmidt, Johnson & Hovey
ATTORNEYS.

United States Patent Office 3,206,175
Patented Sept. 14, 1965

1

3,206,175
HUMIDIFIER
William C. Boteler, Kansas City, Mo., assignor to Puritan Compressed Gas Corporation, Kansas City, Mo., a corporation of Missouri
Filed Apr. 18, 1960, Ser. No. 22,954
5 Claims. (Cl. 261—16)

This invention relates to humidification equipment and particularly to a device for adding moisture or a combination of moisture and medication to a gas utilized for therapeutic resuscitation or other medical purposes. The present humidifier is especially adapted for utilization in oxygen therapy.

Although humidifiers have previously been provided on oxygen equipment employed in therapeutic practices, many difficulties have been experienced with prior humidifiers, particularly when the same are constructed so as to permit preselected proportions of diluting air to be admitted into the stream of oxygen, and also problems associated with clogging of the injection nozzles forming a part of the humidification apparatus.

It is therefore the primary object of the instant invention to provide a humidification unit for oxygen equipment permitting dilution of the oxygen with preselected proportions of air and yet which may be adjusted in a manner so that no diluting air whatsoever is permitted to enter the dry gas stream under certain operating conditions of the oxygen equipment.

It is a further important object of the invention to provide a humidifier including a liquid receptacle having a closure head removably mounted thereon, and with the closure head having novel means forming a part thereof for permitting selected proportions of diluting air to be admitted to the gas stream at the area of injection of the gas into the humidifier to thereby insure thorough dilution of the dry gas at the time of mixing of the latter with the liquid.

A further important object of the invention is to provide humidification apparatus wherein the means for diluting the oxygen with air is disposed in spaced relationship to the dry gas injection nozzle, and including novel structure for effectively precluding entrance of any diluting air into the humidifier during selected times at the control of the operator of the apparatus.

A still further important aim of the invention is to provide a humidifier having a novel dry gas and liquid mixing chamber defined by a tubular member on the closure head of the device, with the mixing chamber being in communication with the main area of the liquid receptacle at two points in order to preclude the liquid from creeping up in the mixing chamber during operation of the humidification device, while the means for admitting diluting air is completely closed.

A further important object of the invention is to provide improved mechanism for maintaining the liquid nozzle of the humidifier completely free of materials which would clog the same by virtue of provision of a wire disposed in the liquid nozzle and reciprocable in response to movement of a finger actuated component extending outwardly through the closure head on the liquid receptacle.

An additional object of the invention is to provide a humidifier the major components of which may be molded to simplify construction of the same, maintain the same at a minimum cost and assure a long useful life thereof by virtue of the materials used in such molding notwithstanding the fact that the same may be readily subjected to sterilization temperatures.

Other important objects and details of construction of the present humidifier will become obvious or be explained in greater detail as the following specification progresses.

2

Figure 3:
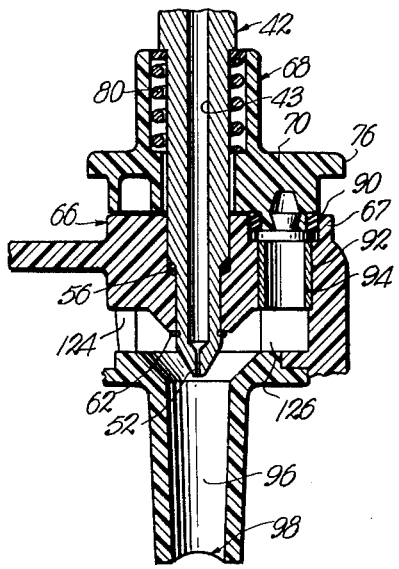
Figure 2:
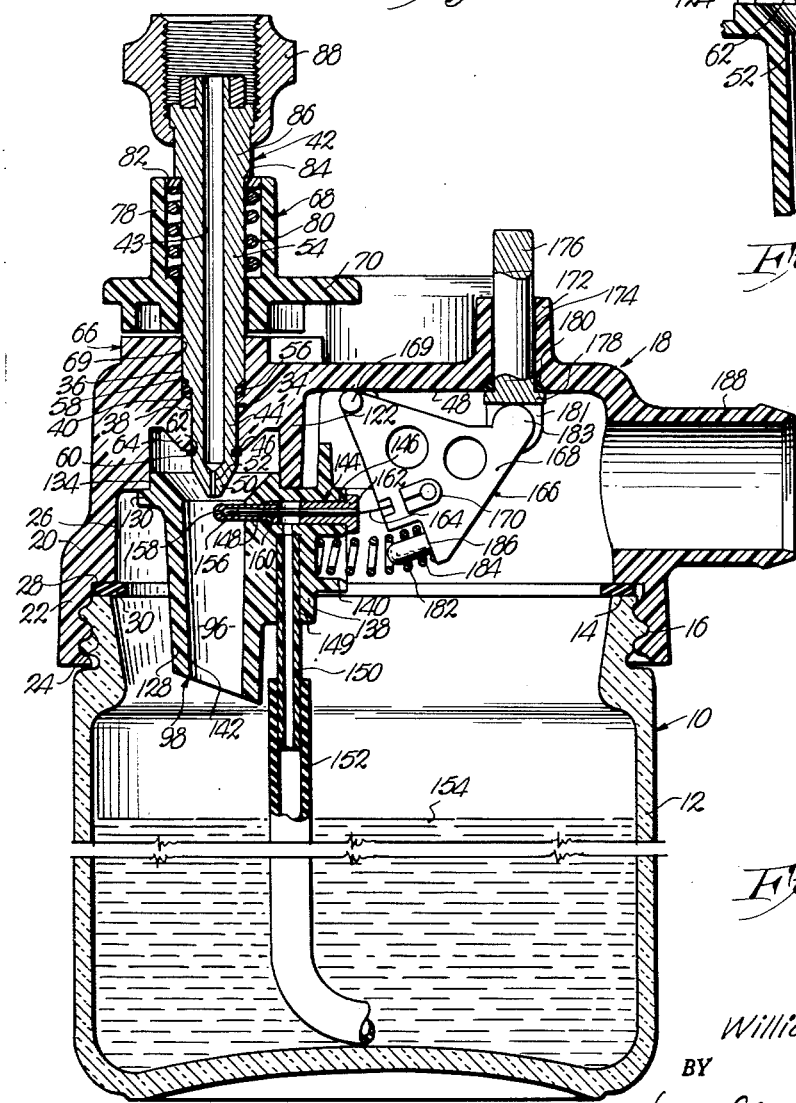
Figure 4:
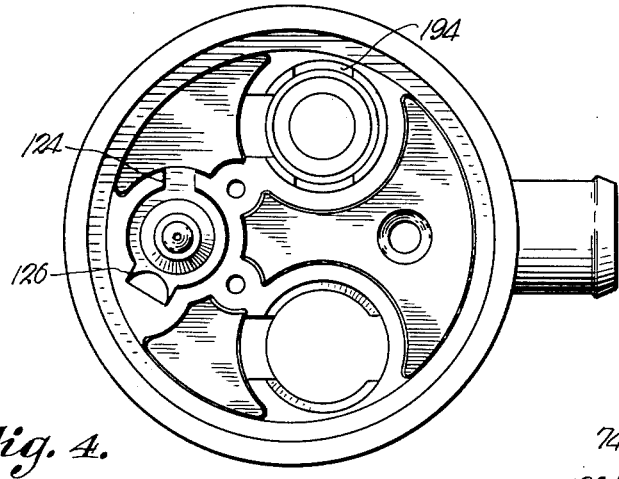
Figure 5:
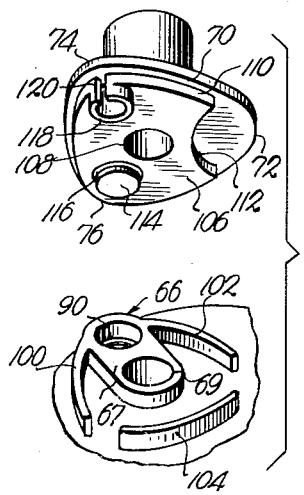
Figure 6:
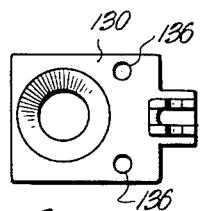

In the drawings:
FIGURE 1 is a plan view of the present humidifier and illustrating the closure head forming a part of the same;
FIG. 2 is a greatly enlarged, vertical cross-sectional view taken on the line 2—2 of FIG. 1 and looking in the direction of the arrows, certain parts thereof being broken away and in section;
FIG. 3 is an enlarged, vertical, fragmentary, cross-sectional view on the line 3—3 of FIG. 1 and particularly illustrating the gas dilution structure of the closure head;
FIG. 4 is an enlarged, bottom view of the closure head alone and forming a part of the humidifier;
FIG. 5 is a fragmentary, exploded, perspective view of certain components of the gas dilution means as shown in FIG. 3; and
FIGS. 6, 7, 8 and 9 are plan, side, bottom and end elevational views respectively of structure normally mounted on the inner face of the closure head and defining a gas and liquid mixing chamber.

The humidifier broadly designated 10 in the accompanying drawings and showing the preferred embodiment of the present invention, includes a liquid receptacle 12 which may be a glass jar or the like, having an upper circular margin 14 defining the upper edge of external threads 16 integral with the main body of receptacle 12. Closure head 18 removably mounted on receptacle 12 is constructed primarily of a synthetic resin substance, with nylon being the preferred material.

Closure head 18 has a main, generally cylindrical body portion 20 provided with a lower, annular skirt section 22 having inwardly facing threads 24 adapted to complementally engage threads 16 on receptacle 12. The inner cylindrical surface 26 of main body portion 20 is of less diameter than the median diameter of threads 24 to present a downwardly facing shoulder 28 complemental with edge 14 of receptacle 12. Annular gasket 30 of rubber or the like, normally positioned on shoulder 28, is disposed to engage edge 14 and thereby provide a liquid and gas-tight seal between shoulder 28 and edge 14 when closure head 18 is threaded onto the upper end of receptacle 12, as illustrated in FIG. 2. The upper circular wall 32 of closure head 18 and integral with the upper margin of main body portion 20 has a normally vertical passage 34 therein, with the upper section 36 of passage 34 being of greater diameter than the lower section 38 thereof, with a generally frusto-conical shoulder 40 forming a part of wall 32 being interposed between sections 36 and 38.

Elongated dry gas injection nozzle 42, having an elongated central bore 43 therethrough, is telescoped in passage 34 and has a lower portion 44 extending downwardly through the opening 46 in the inner face 48 of head 18. The lowermost extremity 50 of nozzle 42 is conical in configuration and has a relatively narrow bore 52 therethrough on the axis of nozzle 42 communicating with bore 43. An intermediate section 54 of nozzle 42 is complementally received within upper section 36 of passage 34, while an annular gasket 56 is interposed between shoulder 40 and the frusto-conical surface 58 of nozzle 42 between section 54 and lower portion 44. In order to releasably maintain nozzle 42 in passage 34, a U or C clip 60 is received within complemental groove means 62 therefor in the outer surface of portion 44 adjacent end 50 of nozzle 42, with one face of clip 60 frictionally engaging the lowermost face of an integral frusto-conical section 64 of head 18. Upwardly extending guide means 66 of head 18 has a main section 67 provided with an opening 69 receiving nozzle 42 and serves as means for limiting downward movement of air dilution control means broadly designated 68 and also mounted on nozzle 42 in telescoped relationship thereto (FIGS. 2 and 3). Control means 68 includes a plate-like element 70 rotatable about the axis of nozzle 42 and of generally triangular configuration, as illustrated in FIG. 1. For appearance purposes, it is desirable that the outer edges of element 70 be of curvilinear configuration between respective apexes 72, 74 and 76. An upstanding tubular boss 78 integral with the normally upper face of element 70 surrounds nozzle 42 in spaced relationship thereto in order to accommodate coil spring 80, bearing against the upper face of element 70, and an annular collar 82 resting against a downwardly facing shoulder 84 defined by the outer surface of the upper end 86 of nozzle 42. An internally threaded coupling 88 is rotatably mounted on the upper end 86 of nozzle 42 in order that an oxygen line may be coupled to humidifier 10.

Main section 67 of guide means 66 extending toward the central part of top wall 32 has an aperture 90 therein in direct communication with an elongated, upright passage 92 in top wall 32, as shown in FIG. 3. Passage 92 is of less diameter than aperture 90 and receives a sleeve 94 extending a substantial part of the length thereof. Passage 92 communicates with a mixing chamber 96 defined by tubular structure broadly designated 98. The tubular structure extends downwardly into a primary chamber formed by the receptacle 12 and closure head 18. Structure 98 is mounted on the underface of closure head 18 in coaxial relationship with nozzle 42, as will be explained in greater detail hereinafter.

Guide means 66 also is provided with a pair of longitudinally arcuate guide strips 100 and 102 integral with main section 67 adjacent aperture 90, while a third longitudinally arcuate guide strip 104 is integral with the upper face of top wall 32. It is to be understood that strips 100, 102 and 104 substantially conform to and are disposed in positions complemental with the outer arcuate edges of element 70 when the latter is disposed in preselected positions.

Flat segment 106 integral with the normally lower face of element 70 and having an opening 108 therein coaxial with opening 69, clears nozzle 42 while the outer arcuate margins 110 of section 106 are spaced from and complemental with corresponding outwardly disposed, longitudinally curved edges of element 70. In the preferred construction, the distance between margins 110 and the outer adjacent edges of element 70 is approximately equal to the width of corresponding strips 100, 102 and 104.

A part of segment 106 is cut away at 112, as best shown in FIG. 5, to present an area clearing aperture 90 when apex 72 of element 70 is in proximity to aperture 90.

A cylindrical member 114 is integral with segment 106 adjacent apex 76 of element 70 and is adapted to be telescoped in aperture 90 when element 70 is positioned with apex 76 in proximal relationship to aperture 90. An O-ring 116 surrounding member 114 and disposed adjacent the lower face of segment 106 is adapted to be compressed when member 114 is disposed in aperture 90 to thereby preclude entrance of any air whatsoever into passage 94 around the outer surface of ring 116.

A cylindrical component 118 integral with the lower surface of segment 106 in proximal relationship to apex 74 of element 70 has an elongated slot 120 therein extending the full length of the same, with component 118 also being adapted to be received within aperture 90 when apex 74 of element 70 is adjacent the same. It is to be understood that component 118 is of sufficient length to engage sleeve 92 and maintain the lower face of segment 106 out of engagement with main section 67 of guide means 66 to thereby permit air to enter component 118 through slot 120.

A semicylindrical partition segment 122 of head 18 integral with lower face 48 of wall 32 and coaxial with passage 34, surrounds frusto-conical section 64 to present a part of the dry gas and liquid mixing chamber primarily defined by structure 98. Segment 122 has a slot or opening 124 therein and a slot 126 in opposition to slot 124 for communicating the interior of structure 98 with passage 92, as illustrated in FIG. 3.

Figure 7:
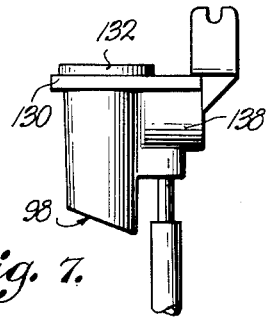
Figure 9:
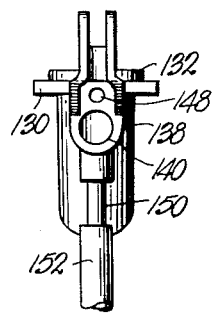
Figure 8:
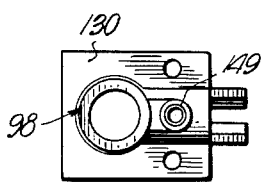

Structure 98 has a main tubular body 128 provided with an outwardly projecting, generally rectangular flange section 130 at the upper end thereof adapted to lie in flat engagement with the lower margin of segment 122 and the corresponding opposed part of main body portion 20 defining a part of the mixing chamber. As indicated in FIG. 7, the upper tubular boss portion 132 of structure 98 and extending above flange 130 is adapted to be complementally received within the circular opening 134 presented by segment 122 and main body portion 20 of head 18.

Flange 130 has a pair of openings 136 therein adapted to receive holding means (not shown) for releasably coupling flange 130 and thereby the entire structure 98 to the underface of closure head 18. An integral, rearwardly extending boss portion 138 on the outer face of main body 128 of structure 98 has a cylindrical recess 140 therein disposed with the axis of the same in perpendicular relationship to the axis of main passage 142 of body 128 and defining chamber 96. Boss portion 138 is also provided with a somewhat smaller, transversely extending passage broadly designated 144 therethrough parallel with the axis of recess 140 and including an outer section 146 and an inner section 148 of less diameter than section 146 and communicating directly with passage 142. Another passage 149 through boss portion 138 and perpendicular to the axis of passage 144 communicates with section 146 and complementally receives an elongated liquid delivery tube 150. As shown in FIG. 2, a flexible tube 152 is telescoped over the outer end of tube 150 projecting downwardly from boss portion 138, flexible tube 152 extending downwardly into liquid 154 contained in receptacle 12 and terminating at the bottom of the latter.

A liquid injection nozzle 156 is positioned in section 146 of passage 144, extends outwardly from the latter into chamber 96 and terminates directly below bore 52 of nozzle 42. The outer end of liquid nozzle 156 has an orifice 158 therein, with the axes of aperture 158 and the bore 160 through nozzle 156 being in perpendicular relationship to the longitudinal axis of nozzle 42.

A tubular fitting 162 having an outer flange is telescoped in the outer end of section 146 of passage 144 to receive and guide an elongated wire 164 extending through fitting 162 as well as nozzle 156 and normally terminating adjacent orifice 158 therein.

Mechanism broadly designated 166 is provided for reciprocating wire 164 and including a generally triangularly shaped member 168 carried by closure head 18 for rotation about pin 169. Coupling 170 on one face of member 168 serves to releasably secure the end of wire 164 to member 168. Upstanding tubular boss 172 on the upper surface of wall 32 in spaced relationship to control 68, is directly aligned with an aperture 174 in wall 32 and reciprocably receives an elongated, finger actuated stem 176. Stem 176 has a flange 178 on the lower end thereof of greater diameter than the aperture 174, as well as the bore of boss 172, while an O-ring 180 is disposed in surrounding relationship to the lower end of stem 176 in complemental engagement with the adjacent surface of flange 178. Downwardly extending ear 181 integral with the lower face of flange 178, is pivotally joined to projection 183 at the proximal apex of member 168. As shown in FIG. 2, O-ring 180 provides a fluid-tight seal against the underface of wall 32.

Means for biasing stem 176 toward the upper position thereof comprises a coil spring 182 received in recess 140 and surrounding a projection 184 on edge 186 of member 168 presented by a notch in the apex of member 168 normally adjacent structure 98.

Main body portion 20 of head 18 has an integral outlet boss 188 adapted to receive a conduit and disposed in direct opposition to the mixing chamber 96 (FIG. 2). Top wall 32 also has a pair of opposed openings 190 and 192 which are preferably formed with side walls to receive special connectors or plugs, as will be explained hereinafter.

In operation, it is initially assumed that a source of oxygen is connected to coupling 88, that a liquid 154 such as water is provided in receptacle 12, that openings 190 and 192 in head 18 are closed with suitable fluid-tight plugs, and that a conduit is joined to boss 188 and leads to a gas distribution device such as a face mask, oxygen tube, catheter tube or tracheotomy tube. It is also initially presumed that element 70 is positioned so that member 114 is telescoped in aperture 90 to thereby preclude entrance of diluting air into chamber 96.

Upon opening of the valve in the oxygen supply line, the dry gas flows downwardly through bore 43 of nozzle 42 and is ejected into the chamber defined by segment 122 as well as main body portion 20 of closure head 18, and also chamber 96 of structure 98. The stream of dry gas emanating from bore 52 of nozzle 42 impinges directly on the outer extremity of liquid nozzle 156. The high velocity of the dry gas and the change in direction of the velocity vector caused by direction of the gas against the projecting extremity of liquid nozzle 156, produces a low pressure area in the interior of nozzle 156 with respect to the pressure existing in the primary chamber. By virtue of creation of a low pressure zone within liquid nozzle 156, a partial vacuum is produced in tubes 150 and 152, whereby the pressure in the primary chamber on the upper surface of liquid 154 forces the liquid up through tubes 152 and 150 into nozzle 156. As the liquid emerges from aperture 158, the high velocity dry gas stream breaks the issuant liquid into fine particles, some of which flash immediately into vapor while the remainder are either condensed in receptacle 12 above the level of liquid 154, or are carried in suspension in the gas stream outwardly through boss 188 and thence the gas discharge conduit. By virtue of this operation, a predetermined proportion of liquid is introduced into the dry gas stream so that the gas eventually conveyed to the patient is at a proper humidity.

In certain instances however, it is desirable that the oxygen be diluted with a predetermined proportion of air and this dilution may be readily accomplished by grasping boss 78 of control 68 and pulling the latter upwardly against the action of coil spring 80 until member 114 and component 118 clear guide strips 100, 102 and 104 to thereby allow element 70 and boss 78 to be rotated about the axis of nozzle 42.

If it is desired that only a limited amount of air be introduced into the oxygen stream, control 68 is rotated until component 118 is in alignment with aperture 90, whereupon release of boss 78 permits spring 80 to bias component 118 into aperture 90. Since the oxygen emanating from bore 52 of nozzle 42 is caused to expand in a relatively large area defined by segment 122 of head 18 as well as chamber 96 of structure 98, an area of reduced pressure is produced in passage 92 as the oxygen flows downwardly through main body 128 of structure 98. Thus, the expanding oxygen gas stream acts as an aspirator and pulls air into the interior of chamber 96 through slot 120 of component 118, thence through passage 92 and finally through slot 126 into the interior of structure 98. As explained above, the proportion of air permitted to flow into the oxygen gas stream through aperture 90 when component 118 is positioned therein is dependent upon the width of slot 120 and the rate at which the oxygen emanates from nozzle 42. In the preferred embodiment of humidifier 10, the contents of oxygen when component 118 is in aperture 90 is 70% oxygen in the oxygen-air mixture.

When greater dilution of the oxygen with air is required, control 68 may again be rotated as described above to place the apex 72 of element 70 in proximal relationship to aperture 90 whereby flow of air into the same is unrestricted by virtue of cut-away 112 of flat segment 106 entirely clearing the opening presented by aperture 90. When humidifier 10 is operated with aperture 90 unrestricted the contents of oxygen in the preferred embodiment will be 40% oxygen in the oxygen-air mixture.

Slot 124 communicating the upper end of chamber 96 with receptacle 12 prevents liquid 154 from climbing up the side walls of main body 128 defining passage 142 and thereby clogging orifice 158 of nozzle 156 and also interfering with normal operation of nozzle 42. Operation of humidifier 10 with aperture 90 closed by member 114 would cause some liquid to rise in main body 128 because of the aspiration action of the apparatus, if such liquid were not permitted to drain back into receptacle 12 through chamber 96 by means of the circulating gas stream through slot 124 without interfering with normal operation of the gas and liquid ejection means. The liquid recirculation effected in structure 98 also produces better mixing of oxygen and liquid particles.

Inasmuch as it is desirable to place medication in liquid 154 for certain applications such as glycerin, a saline solution or various liquid and powder therapeutic agents which are dissolved in the liquid, it has been found that problems arise from clogging of the passage through nozzle 156 and particularly aperture 158 therein, unless provision is made for removing such materials therefrom. In the instant humidifier, congealed or solid materials may be removed from the interior of nozzle 156 and aperture 158 therein by reciprocating wire 164 which passes outwardly through aperture 158. Cleaning may be effected during operation of humidifier 10 by simply depressing stem 176 which rotates member 168 about pin 169, thereby shifting wire 164 back and forth in response to vertical reciprocation of stem 176 against the action of coil spring 182.

In certain applications it is desirable to utilize a pressure relief valve in one of the openings 190 or 192 and this may readily be accomplished by removing the plug such as 194 followed by insertion therein of the valve. Other accessories for placement in openings 190 and 192 include an immersion heating device, or conduit means for communicating the interior of receptacle 12 with apparatus such as an intermittent positive pressure breathing unit.

Having thus described the invention what is claimed as new and desired to be secured by Letters Patent is:

1. Gas humidification apparatus comprising:
   a receptacle adapted to receive a quantity of liquid for humidifying an essentially dry gas;
   a head unit on the receptacle provided with a humidified gas outlet and cooperable with the receptacle to define a primary chamber;
   structure on the head unit presenting a secondary mixing chamber having an outlet communicating the mixing chamber directly with the primary chamber;
   a dry gas injection nozzle mounted in the head, said nozzle being adapted to be coupled to a source of essentially dry gas and provided with a gas ejection bore extending into said mixing chamber adjacent one extremity thereof;
   a liquid nozzle mounted in the head and provided with an orifice within said mixing chamber, said orifice being in proximal relationship to said gas ejection bore and directly in the path of travel of gas emanating from the gas nozzle to effect lowering of the pressure in said liquid nozzle relative to the pressure in said primary chamber; and conduit means communicating the liquid nozzle with the portion of the primary chamber receiving said liquid, said structure including a partition segment between said primary chamber and said mixing chamber and surrounding said gas nozzle in said mixing chamber, said segment being provided with an opening therethrough in spaced relationship from said outlet of the mixing chamber and disposed between said primary and mixing chambers to communicate the portion of the secondary mixing chamber in generally surrounding relationship to the gas nozzle therein directly with the primary chamber for effecting equalization of the pressure between the primary chamber and said mixing chamber to preclude accumulation of liquid on the surface of said structure defining said mixing chamber.

2. The invention of claim 1 wherein is included a wire disposed for movement through said liquid nozzle, a reciprocable stem extending through said head, and means coupling the stem with said wire for reciprocating the wire generally longitudinally through said liquid nozzle between a location clearing the orifice and a position therein at least a part of the wire extends through the orifice and is directly in the path of travel of the gas emanating from the gas injection nozzle.

3. The invention of claim 1, wherein is included:

a member pivotally attached to the head for swinging movement in said primary chamber;

a reciprocable stem extending through the head for movement in directions substantially orthogonally of said liquid nozzle, one end of the stem being pivotally attached to the member for swinging the latter;

a wire disposed in said liquid nozzle and attached to said member for movement in the liquid nozzle generally longitudinally thereof during swinging of the member; and yieldable means coupled with said member for normally maintaining the member in a position permitting the end of said wire remote from said member to clear said orifice, whereby swinging of the member against the action of said yieldable means advances said end of the wire through the orifice and directly in the path of travel of the gas emanating from the gas injection nozzle.

4. The invention of claim 1, wherein the head is provided with a passage therein communicating the mixing chamber with the atmosphere, and wherein is provided structure having means thereon for rotatably mounting the same on the head on the outer surface in proximity to said passage, said structure including an element having portions spaced from the axis of rotation of the structure and at least partially overlying the passage when said structure is rotated into certain positions thereof, a member secured to said element at one of said portions thereof and movable into said passage in completely blocking relationship thereto for preventing passage of air into the chamber through said passage when said structure is rotated into the corresponding position thereof, and a component secured to said member at another portion thereof and movable into said passage when the structure is in another position thereof, said component having a slot therein communicating the passage with the atmosphere whereby the component is in partial blocking relationship to said passage and serving to restrict the amount of diluting air permitted to pass into the chamber through said passage during operation of the apparatus.

5. Gas humidification apparatus comprising:

a receptacle adapted to receive a quantity of liquid for humidifying an essentially dry gas;

a head unit on the receptacle provided with a humidified gas outlet and cooperable with the receptacle to define a primary chamber;

structure on the head unit including a tubular body forming a second mixing chamber therewithin and extending into said primary chamber, the end of the body remote from the head communicating the mixing chamber with the primary chamber;

a dry gas injection nozzle mounted in the head, said nozzle being adapted to be coupled with a source of essentially dry gas and provided with a gas ejection bore disposed within said mixing chamber proximal to the end opposite said remote body end of said tubular body for directing gas through the mixing chamber toward said end remote from the head;

a liquid nozzle mounted in said structure and provided with an orifice within said mixing chamber, said orifice being in proximal relationship to said gas ejection bore and directly in the path of travel of gas emanating from the gas nozzle to effect lowering of the pressure in said liquid nozzle relative to the pressure in said primary chamber; and conduit means communicating the liquid nozzle with the portion of the primary chamber receiving said liquid, said structure including a partition segment between said primary chamber and said mixing chamber and surrounding said gas nozzle in said mixing chamber, said segment being provided with an opening therethrough in proximal relationship to said gas ejection bore and disposed between said primary and mixing chambers to communicate the portion of the secondary mixing chamber in generally surrounding relationship to the gas nozzle therein directly with the primary chamber for effecting equalization of the pressure between the primary chamber and said mixing chamber to preclude accumulation of liquid on the surface of the body forming said mixing chamber.

References Cited by the Examiner

UNITED STATES PATENTS

| 466,978 | 1/92 | Garland | 239—117 |
| 2,701,710 | 2/55 | Schilling et al. | 261—114 |
| 2,718,934 | 9/55 | Norgren et al. | |
| 2,847,248 | 8/58 | Schmaitt et al. | 239—338 |
| 2,951,644 | 9/60 | Mahon et al. | 239—338 XR |
| 2,952,412 | 9/60 | Munson | 239—117 |

FOREIGN PATENTS 583,284  9/59  Canada.

HARRY B. THORNTON, *Primary Examiner.*

EUGENE F. BLANCHARD, HERMAN BERMAN,
*Examiners.*